(12) United States Patent
Blagojevic et al.

(10) Patent No.: US 8,312,084 B2
(45) Date of Patent: Nov. 13, 2012

(54) COMBINED JOIN AND STATE TRANSFER (75) Inventors: Vladimir Blagojevic, Toronto (CA);
Bela Ban, Kreuzlingen (CH)

(73) Assignee: Red Hat, Inc., Raleigh, NC (US)

( * ) Notice: Subject to any disclaimer, the term of this patent is extended or adjusted under 35 U.S.C. 154(b) by 599 days.

(21) Appl. No.: 12/074,089

(22) Filed: Feb. 28, 2008

(65) Prior Publication Data

US 2009/0219945 A1 Sep. 3, 2009

(51) Int. Cl.
*G06F 15/16* (2006.01)
(52) U.S. Cl. .................. 709/205; 709/204; 709/206
(58) Field of Classification Search .......... 709/204–206
See application file for complete search history.

(56) References Cited

U.S. PATENT DOCUMENTS

| | | | |
|---|---|---|---|
| 6,457,045 B1 * | 9/2002 | Hanson et al. | 709/206 |
| 7,369,260 B2 * | 5/2008 | Buschi et al. | 358/1.15 |
| 7,516,078 B2 * | 4/2009 | Dhawan et al. | 709/231 |
| 7,634,519 B2 * | 12/2009 | Creamer et al. | 1/1 |
| 2003/0055892 A1 * | 3/2003 | Huitema et al. | 709/204 |
| 2004/0039781 A1 * | 2/2004 | LaVallee et al. | 709/205 |
| 2007/0266091 A1 * | 11/2007 | Lin et al. | 709/204 |
| 2009/0158173 A1 * | 6/2009 | Palahnuk et al. | 715/753 |

OTHER PUBLICATIONS

Bela Ban, [JGRP-204] State transfer on JOIN, May 22, 2006, jira.boss.org.*
Bela Ban, [JGRP-236] Combine join and state transfer, Aug. 15, 2007, jira.boss.org.*

* cited by examiner

*Primary Examiner* — Brian P Whipple
(74) *Attorney, Agent, or Firm* — Lowenstein Sandler PC (57) ABSTRACT A method and apparatus for processing messages is described. In one embodiment, an application programming interface provides for a flush protocol to force members of a group to send all of their pending messages prior to a predetermined event. A client sends a request to a coordinator of the group to join the group and to transfer a state of the group to the client. The application programming interface performs a single flush operation on the group in response to the request.

26 Claims, 7 Drawing Sheets

COMBINED JOIN AND STATE TRANSFER

TECHNICAL FIELD

Embodiments of the present invention relate to group communication, and more specifically to processing of messages.

BACKGROUND

Group communication protocol designed for multicast communication may be used to communicate messages between endpoints forming a group. Communication endpoints can be processes or objects, or any entity that can send and receive messages to/from a group.

A flush protocol forces group members to send all their pending message prior a predetermined event. The process of flushing acquiesces the cluster so that a state transfer operation or a join operation can be achieved. Thus, a flush operation is performed on a group when a new member joins the group. Subsequently, in to transfer the state of the group to the new member, another flush operation needs to be performed. As such, two flush operations are required upon a join and state transfer operations. It would be desirable to require only one flush operation for both join and state transfer operations.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for flushing messages in a group. In one embodiment, an application programming interface provides for a flush protocol to force members of a group to send all of their pending messages prior to a predetermined event. A client sends a request to a coordinator of the group to join the group and to transfer a state of the group to the client. The application programming interface performs a single flush operation on the group in response to the request.

Group Communication Architecture

Figure 1:
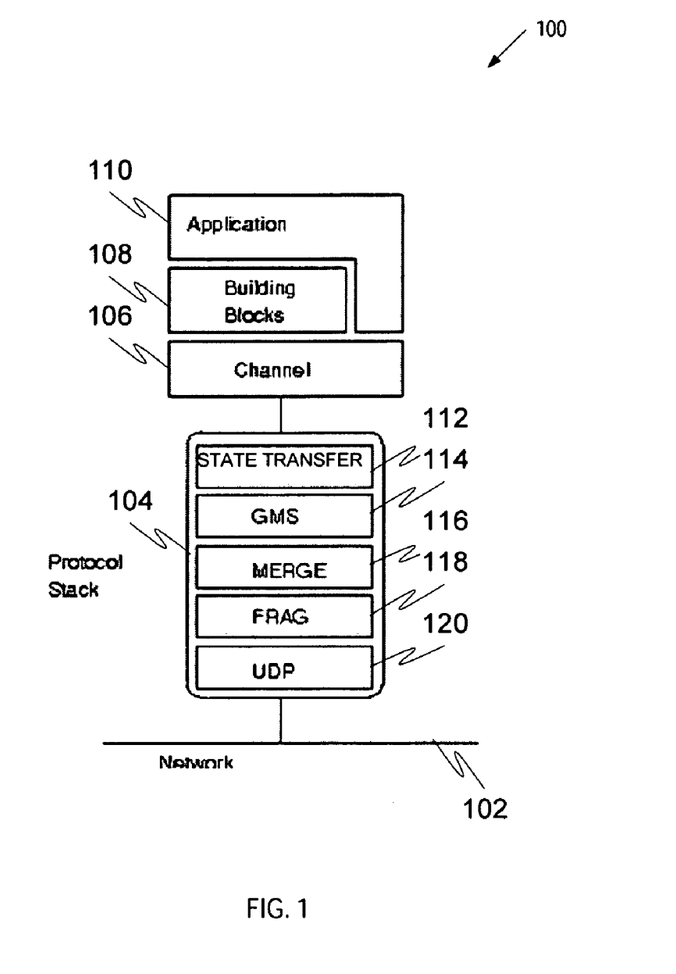
FIG. 1 illustrates a network architecture of a group communication in which embodiments of the present invention may be implemented.

FIG. 1 illustrates an exemplary network architecture of a group communication 100 in which embodiments of the present invention may operate. Processes can join a group, send messages to all members or single members and receive messages from members in the group. The system keeps track of the members in every group, and notifies group members when a new member joins, or an existing member leaves or crashes. A group is identified by its name. Groups do not have to be created explicitly; when a process joins a non-existing group, that group will be created automatically. Member processes of a group can be located on the same host, within the same LAN, or across a WAN. A member can be part of multiple groups.

In one embodiment, a JAVA™ application uses JGroups library in order to achieve group communication between members. Group communication involves message exchange between set of processes in presence of process failures and network interruptions. One powerful feature of JGroups is its flexible protocol stack, which allows developers to adapt JGroups to exactly match their application requirements and underlying network characteristics. By mixing and matching protocols multiple application requirements can be satisfied at a minimum cost.

Each group member/process in JGroups is represented by JChannel object. The best way to think of a JChannel is a socket like abstraction allowing message sending and receiving. JChannel also allows registration of callback interfaces that are invoked when channel related events occur. Messages exchanged between JChannel instances have a payload and a pair of sender and receiver addresses. A view is an ordered list of member addresses representing current agreed membership of a group/cluster. When a new member joins, or a member crashes, a new view will be installed in all members *including* the new member. For example, if we have a cluster of A, B and C, the view is V12={A,B,C}. If a new member D joins, then everyone will have view V13={A,B,C,D}. If member A crashes, we will have view V14={B,C,D}. Note that we add members in the order in which they join the group.

The group communication architecture may comprise three parts: (1) a channel API 106 used by application programmers to build reliable group communication applications, (2) building blocks 108, which are layered on top of channel 106 and provide a higher abstraction level and (3) a protocol stack 104, which implements the properties specified for a given channel.

Channel 106 is connected to protocol stack 104. Whenever an application sends a message, channel 106 passes it on to protocol stack 104 comprising several protocols 112, 114, 116, 118, 120. The topmost protocol processes the message and the passes it on to the protocol below it. Thus, the message is handed from protocol to protocol until the bottom protocol puts it on the network 102. The same happens in the reverse direction: the bottom (transport) protocol listens for messages on network 102. When a message is received, it will be handed up protocol stack 104 until it reaches channel 106. Channel 106 stores the message in a queue until application 110 consumes it.

When an application 110 connects to a channel 106, protocol stack 106 will be started, and when it disconnects protocol stack 104 will be stopped. When the channel 106 is closed, the stack 140 will be destroyed, releasing its resources.

Channel

To join a group and send messages, a process has to create a channel and connect to it using the group name (all channels with the same name form a group). The channel is the handle to the group. While connected, a member may send and receive messages to/from all other group members. The client leaves a group by disconnecting from the channel. A channel can be reused: clients can connect to it again after having disconnected. However, a channel may allow only one client to be connected at a time. If multiple groups are to be joined, multiple channels can be created and connected to. A client signals that it no longer wants to use a channel by closing it. After this operation, the channel may not be used any longer.

Each channel has a unique address. Channels always know who the other members are in the same group: an list of member addresses can be retrieved from any channel. This list is called a view. In other words, a view is an ordered list of all members in a group that every member has the same ordered list of member-view. A process can select an address from this list and send a unicast message to it (also to itself), or it may send a multicast message to all members of the current view. Whenever a process joins or leaves a group, or when a crashed process has been detected, a new view is sent to all remaining group members. When a member process is suspected of having crashed, a suspicion message is received by all non-faulty members. Thus, channels receive regular messages, view messages and suspicion messages. A client may choose to turn reception of views and suspicions on/off on a channel basis.

Channels may be similar to BSD sockets: messages are stored in a channel until a client removes the next one (pull-principle). When no message is currently available, a client is blocked until the next available message has been received.

A channel may be implemented over a number of alternatives for group transport. Therefore, a channel is an abstract class, and concrete implementations are derived from it, e.g. a channel implementation using its own protocol stack, or others using existing group transports such as Jchannel and EnsChannel. Applications only deal with the abstract channel class, and the actual implementation can be chosen at startup time.

The properties for a channel may be specified in a colon-delimited string format. When creating a channel (JChannel) a protocol stack will be created according to these properties. All messages will pass through this stack, ensuring the quality of service specified by the properties string for a given channel.

Building Blocks

Channels are simple and primitive. They offer the bare functionality of group communication, and have on purpose been designed after the simple model of BSD sockets, which are widely used and well understood. The reason is that an application can make use of just this small subset of JGroups, without having to include a whole set of sophisticated classes, that it may not even need. Also, a somewhat minimalistic interface is simple to understand: a client needs to know about 12 methods to be able to create and use a channel (and oftentimes will only use 3-4 methods frequently).

Channels provide asynchronous message sending/reception, somewhat similar to UDP. A message sent is essentially put on the network and the send( ) method will return immediately. Conceptual requests, or responses to previous requests, are received in undefined order, and the application has to take care of matching responses with requests.

Also, an application has to actively retrieve messages from a channel (pull-style); it is not notified when a message has been received. Note that pull-style message reception often needs another thread of execution, or some form of event-loop, in which a channel is periodically polled for messages. JGroups offers a push style as well. Push style is easier to use from JAVA™ application perspective. Application receives a callback as messages arrive rather than having to actively pull message in an event loop.

JGroups offers building blocks that provide more sophisticated APIs on top of a Channel. Building blocks either create and use channels internally, or require an existing channel to be specified when creating a building block. Applications communicate directly with the building block, rather than the channel. Building blocks are intended to save the application programmer from having to write tedious and recurring code, e.g. request-response correlation.

Protocol Stack

FIG. 1 illustrates protocol stack 104 with the following protocols: CAUSAL 112, GMS 114, MERGE 116, FRAG 118, UDP 120.

All messages sent and received over the channel have to pass through the protocol stack. Every layer may modify, reorder, pass or drop a message, or add a header to a message. A fragmentation layer might break up a message into several smaller messages, adding a header with an id to each fragment, and re-assemble the fragments on the receiver's side.

The composition of the protocol stack, i.e. its layers, is determined by the creator of the channel: a property string defines the layers to be used (and the parameters for each layer). This string might be interpreted differently by each channel implementation; in JChannel it is used to create the stack, depending on the protocol names given in the property.

Knowledge about the protocol stack is not necessary when only using channels in an application. However, when an application wishes to ignore the default properties for a protocol stack, and configure their own stack, then knowledge about what the individual layers are supposed to do is needed. Although it is syntactically possible to stack any layer on top of each other (they all have the same interface), this wouldn't make sense semantically in most cases.

Message

Figure 2:
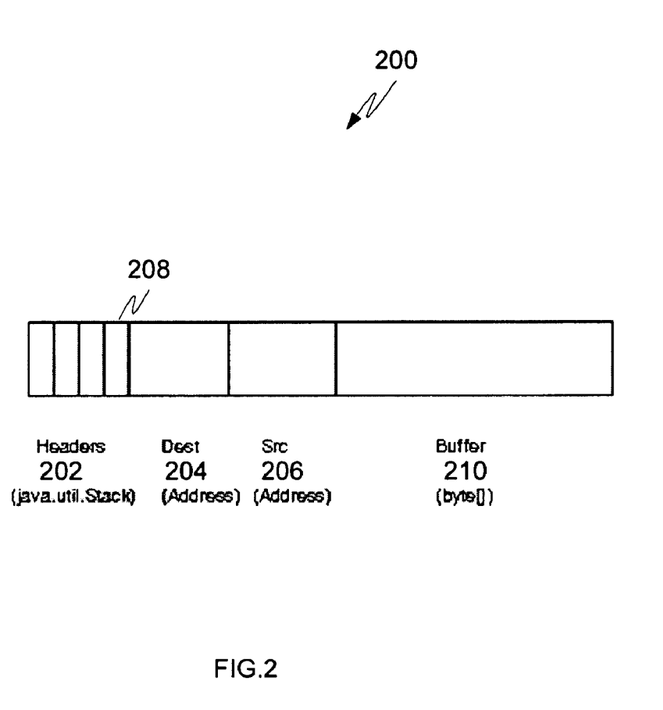
FIG. 2 illustrates a block diagram of one embodiment of a structure of a message.

Data is sent between members in the form of messages. A message can be sent by a member to a single member, or to all members of the group of which the channel is an endpoint. FIG. 2 illustrates an example of a structure of a message 200.

The message 200 may contain five fields: headers 202, destination address 204, source address 206, flags 208, and payload 210.

A list of headers 202 can be attached to a message. Anything that should not be in the payload 210 can be attached to message 200 as a header. Methods putHeader( ), getHeader ( ), and removeHeader( ) of message 200 can be used to manipulate headers 202.

The destination address 204 may include the address of the receiver. If null, the message will be sent to all current group members.

The source address 206 may include the address of a sender. It can be left null, and will be filled in by the transport protocol (e.g. UDP) before the message is put on the network 102.

One byte of the message 200 may be used for flags 208. An example of flag may be OOB.

The payload 210 may include the actual data (as a byte buffer). The message class contains convenience methods to set a serializable object and to retrieve it again, using serialization to convert the object to/from a byte buffer.

The message 200 may be similar to an IP packet and consists of the payload (a byte buffer) and the addresses of the sender and receiver (as addresses). Any message put on the network 102 can be routed to its destination (receiver address), and replies can be returned to the sender's address.

A message usually does not need to fill in the sender's address when sending a message; this is done automatically by the protocol stack before a message is put on the network. However, there may be cases, when the sender of a message wants to give an address different from its own, so that for example, a response should be returned to some other member.

The destination address (receiver) can be an Address, denoting the address of a member, determined e.g. from a message received previously, or it can be null, which means that the message will be sent to all members of the group. A typical multicast message, sending string "Hello" to all members would look like this:

```
Message msg = new Message(null, null, "Hello".getBytes());
channel.send(msg);
```

View

A view is a ordered list of all members in a group where every member has the same ordered list of members—view. It consists of a ViewId, which uniquely identifies the view (see below), and a list of members. Views are set in a channel automatically by the underlying protocol stack whenever a new member joins or an existing one leaves (or crashes). All members of a group see the same sequence of views.

Note that there is a comparison function which orders all the members of a group in the same way. Usually, the first member of the list is the coordinator (the one who emits new views). Thus, whenever the membership changes, every member can determine the coordinator easily and without having to contact other members.

The code below shows how to send a (unicast) message to the first member of a view (error checking code omitted):

```
View myview = channel.getView();
Address first = myview.getMembers().first();
Message msg = new Message(first, null, "Hello world");
channel.send(msg);
```

Whenever an application is notified that a new view has been installed (e.g. by membershipListener.viewAccepted( ) or Channel.receive( )), the view is already set in the channel. For example, calling Channel.getView( ) in a viewAccepted ( ) callback would return the same view (or possibly the next one in case there has already been a new view).

A ViewId is used to uniquely number views. It consists of the address of the view creator and a sequence number. ViewIds can be compared for equality and put in a hashtable as they implement equals( ) and hashCode( ) methods.

Whenever a group splits into subgroups, e.g. due to a network partition, and later the subgroups merge back together, a MergeView instead of a View will be received by the application. The MergeView class is a subclass of View and contains as additional instance variable the list of views that were merged. As an example if the group denoted by view V1:($p,q,r,s,t$) split into subgroups V2:($p,q,r$) and V2:($s,t$), the merged view might be V3:($p,q,r,s,t$). In this case the MergeView would contains a list of 2 views: V2:($p,q,r$) and V2:($s,t$).

Channel States

Figure 3:
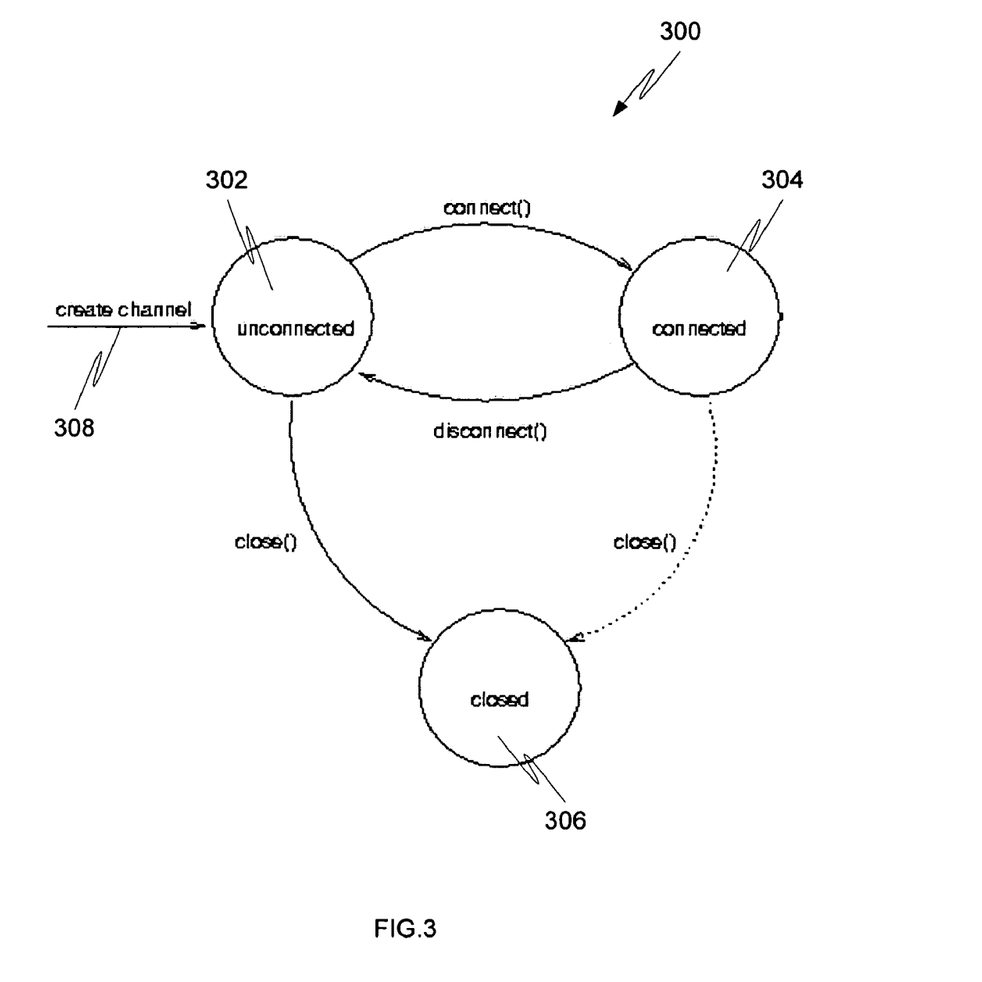
FIG. 3 illustrates a block diagram of one embodiment of channel states.

FIG. 3 illustrates a state transition diagram 300 for the major states a channel can assume. In order to join a group and send messages, a process has to create a channel. A channel is like a socket. When a client connects to a channel, it gives the name of the group it would like to join. Thus, a channel is (in its connected state) always associated with a particular group. The protocol stack takes care that channels with the same group name find each other: whenever a client connects to a channel given group name G, then it tries to find existing channels with the same name, and joins them, resulting in a new view being installed (which contains the new member). If no members exist, a new group will be created.

When a channel is first created at 308, it is in the unconnected state 302. An attempt to perform certain operations which are only valid in the connected state (e.g. send/receive messages) will result in an exception. After a successful connection by a client, it moves to the connected state 304. Now channels will receive messages, views and suspicions from other members and may send messages to other members or to the group. Getting the local address of a channel is guaranteed to be a valid operation in this state (see below). When the channel is disconnected, it moves back to the unconnected state 302. Both a connected and unconnected channel may be closed 306, which makes the channel unusable for further operations. Any attempt to do so will result in an exception. When a channel is closed directly from a connected state, it will first be disconnected, and then closed.

Creating a Channel

A channel can be created in two ways: an instance of a subclass of Channel is created directly using its public constructor (e.g. new JChannel( )), or a channel factory is created, which—upon request—creates instances of channels. We will only look at the first method of creating channel: by direct instantiation. Note that instantiation may differ between the various channel implementations. As example we will look at JChannel.

The public constructor of JChannel looks as follows:
 public JChannel(Object properties) throws ChannelException { }

It creates an instance of JChannel. The properties argument defines the composition of the protocol stack (number and type of layers, parameters for each layer, and their order).

Connecting to a Channel

When a client wants to join a group, it connects to a channel giving the name of the group to be joined:
 public void connect(String groupname) throws ChannelClosed;

The group address is a string, naming the group to be joined. All channels that are connected to the same group (same name) form a group. Messages multicast on any channel in the group will be received by all members (including the one who sent it [3]).

The method returns as soon as the group has been joined successfully. If the channel is in the closed state (see FIG. 3), an exception will be thrown. If there are no other members, i.e. no other client has connected to a group with this name, then a new group is created and the member joined. The first member of a group becomes its coordinator. A coordinator is in charge of multicasting new views whenever the membership changes.

Getting the Local Address and the Group Name

Method getLocalAddress( ) returns the local address of the channel. In the case of JChannel, the local address is generated by the bottom-most layer of the protocol stack when the stack is connected to. That means that—depending on the channel implementation—the local address may or may not be available when a channel is in the unconnected state.
 public Address getLocalAddress( );

Method getChannelName( ) returns the name of the group in which the channel is a member:
 public String getChannelName( );

Again, the result is undefined if the channel is in the unconnected or closed state.

Getting the Current View

The following method can be used to get the current view of a channel:
 public View getView( );

This method does not retrieve a new view (message) from the channel, but only returns the current view of the channel. The current view is updated every time a view message is received: when method receive( ) is called, and the return value is a view, before the view is returned, it will be installed in the channel, i.e. it will become the current view.

Calling this method on an unconnected or closed channel is implementation defined. A channel may return null, or it may return the last view it knew of.

Sending a Message

Once the channel is connected, messages can be sent using the send( ) methods:

public void send(Message msg) throws ChannelNotConnected, ChannelClosed;

public void send(Address dst, Address src, Object obj) throws ChannelNotConnected, ChannelClosed;

The first send( ) method has only one argument, which is the message to be sent. The message's destination should either be the address of the receiver (unicast) or null (multicast). When it is null, the message will be sent to all members of the group (including itself). The source address may be null; if it is, it will be set to the channel's address (so that recipients may generate a response and send it back to the sender).

The second send( ) method is a helper method and uses the former method internally. It requires the address of receiver and sender and an object (which has to be serializable), constructs a Message and sends it.

If the channel is not connected, or was closed, an exception will be thrown upon attempting to send a message.

Receiving a Message

Method receive( ) is used to receive messages, views, suspicions and blocks:

public Object receive(long timeout)
    throws ChannelNotConnected, ChannelClosed, Timeout;

A channel receives messages asynchronously from the network and stores them in a queue. When receive( ) is called, the next available message from the top of that queue is removed and returned. When there are no messages on the queue, the method will block. If timeout is greater than 0, it will wait the specified number of milliseconds for a message to be received, and throw a TimeoutException exception if none was received during that time. If the timeout is 0 or negative, the method will wait indefinitely for the next available message.

Depending on the channel options, the following types of objects may be received:

Message

A regular message. To send a response to the sender, a new message can be created. Its destination address would be the received message's source address. Method Message.makeReply( ) is a helper method to create a response.

View

A view change, signalling that a member has joined, left or crashed. The application may or may not perform some action upon receiving a view change (e.g. updating a GUI object of the membership, or redistributing a load-balanced collaborative task to all members). Note that a longer action, or any action that blocks should be performed in a separate thread. A MergeView will be received when 2 or more subgroups merged into one. Here, a possible state merge by the application needs to be done in a separate thread.

Flush Protocol

Flushing forces group members to send all their pending messages prior to a certain event. The process of flushing acquiesces the cluster so that state transfer or a join can be done. It is also called the stop-the-world model as nobody will be able to send messages while a flush is in process. Flush is used:

State transfer—when a member requests state transfer it tells everyone to stop sending messages and waits for everyone's ack. Then it asks the application for its state and ships it back to the requester. After the requester has received and set the state successfully, the requester tells everyone to resume sending messages.

View changes (e.g. Join)—before installing a new view V2, flushing would ensure that all messages *sent* in the current view V1 are indeed *delivered* in V1, rather than in V2 (in all non-faulty members). This is essentially Virtual Synchrony.

FLUSH is designed as another protocol positioned just below the channel, e.g. above STATE_TRANSFER. STATE_TRANSFER and GMS protocol request flush by sending a SUSPEND event up the stack, where it is handled by the FLUSH protocol. The SUSPEND_OK ack sent back by the FLUSH protocol let's the caller know that the flush has completed. When done (e.g. view was installed or state transferred), the protocol sends up a RESUME event, which will allow everyone in the cluster to resume sending.

Channel can be notified that FLUSH phase has been started by turning channel block option on. By default it is turned off. If channel blocking is turned on FLUSH notifies application layer that channel has been blocked by sending EVENT-.BLOCK event. Channel responds by sending EVENT-.BLOCK_OK event down to FLUSH protocol. In push mode application that uses channel can perform block logic by implementing MembershipListener.block( ) callback method.

FLUSH makes sure that all members 'flush' their pending messages and then stop sending new ones until the join or state transfer is over. However, FLUSH does *not* make sure that—on JOIN—all members have seen the same set of messages before installing a new view. Example: P sends M, but immediately after sending M crashes. If another member Q received M, but R didn't see M, then—with the current FLUSH—R will not see M.

We need to run a messages exchange phase, as part of FLUSH, which makes sure that all member have seen the same set of messages in the same view, before installing a new view. Whether to run this or not could be made configurable. If enabled, we could piggyback the message exchange on START_FLUSH/FLUSH_OK etc.

A simple (but costly) solution would be to simply multicast all messages received from other members before multicasting the FLUSH_OK. A better solution would be to exchange digests with highest sequence numbers seen for all members, and then only multicast the missing messages. In such cases additional message exchange phase is completed before flush phase is over.

Combining Join and State Transfer to Require Only One Flush

Figure 4:
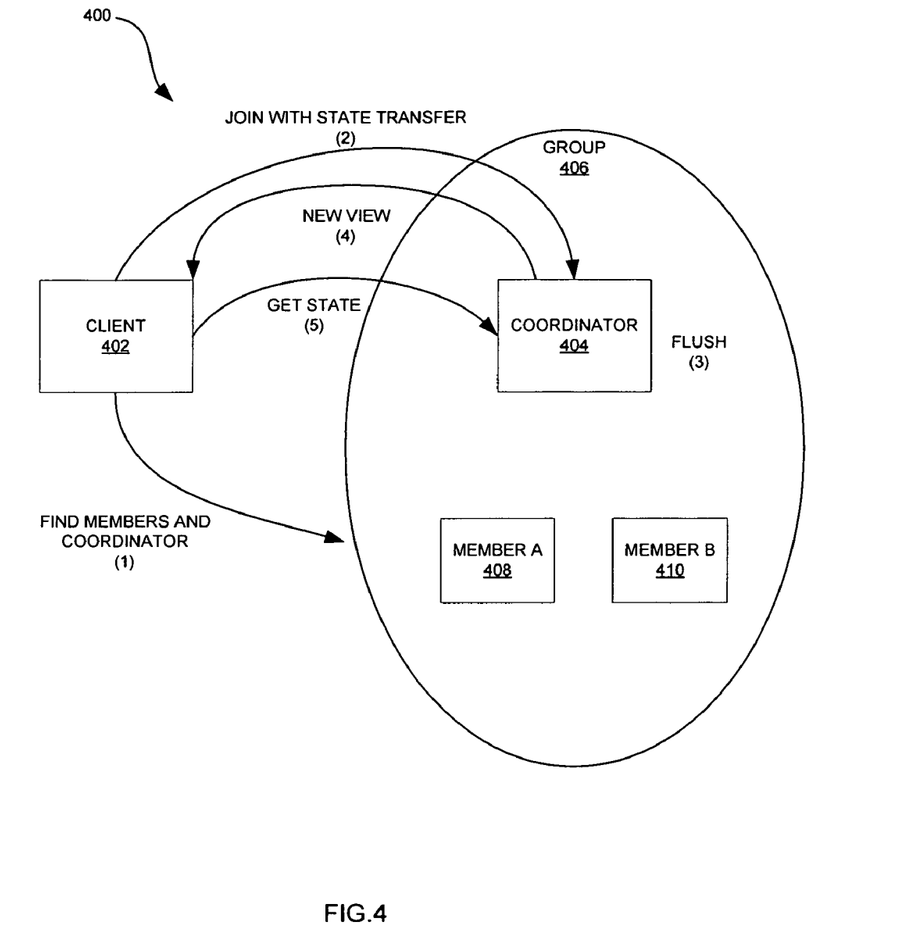
FIG. 4 illustrates a block diagram of one embodiment of a system for enabling a single FLUSH operation for a join request and a state transfer request.

FIG. 4 illustrates a block diagram representing a system 400 for performing only one FLUSH operation for both JOIN and STATE TRANSFER. In one embodiment, system 400 includes a client 402, a coordinator 404 of a group 406. Group 406 may have members 408, 410.

In one embodiment, an additional property (e.g. connect (String group_name, boolean fetch_state, String state_id) may be added to Channel, so that joining and state transfer can be combined into one operation. As a result, this would require only one FLUSH phase. The state would be returned either via pulling with Channel.receive( ) or pushing the setState( ) method in a registered Receiver/MessageListener. In one embodiment, the JOIN_REQ contains the boolean.

The algorithm in GMS is the same as the two described above, except that before multicasting the new view and sending the JOIN_RSPs and LEAVE_RSPs, we ask the application for its state (GET_APPLSTATE) and when received (GET_APPL-STATE_OK), we send it back to the joining member(s), and the RESUME sending messages.

At step 1, client 402 finds initial members 408, 410 and determines coordinator 404 of group 406. At step 2, client 402 sends a join-with-state-transfer request to coordinator 404. At step 3, coordinator 404 initiates a flush, quiets cluster 406, and then sends a new view to everyone including client 402 at step 4. However, coordinator 404 does not stop flush as it usually does for regular join requests. Client 402, after it receives a first view, sends a get state event to coordinator 404 at step 5. After client 402 receives the state, client 402 stops the flush and everyone proceeds as usual. At this point connect method invoked by a user returns.

Computer System

Figure 5:
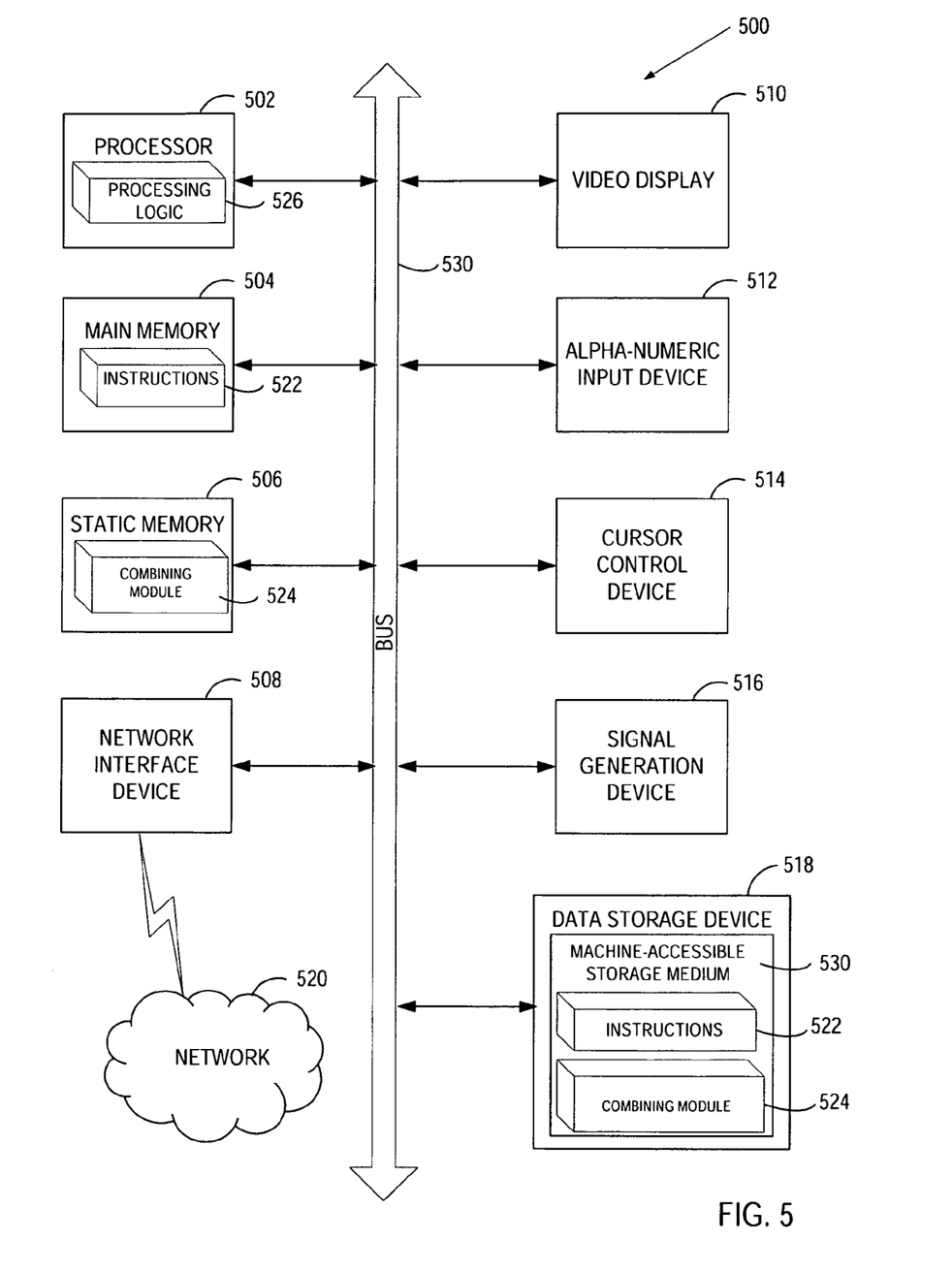
FIG. 5 illustrates a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store combining module 524. Combining module 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Figure 6:
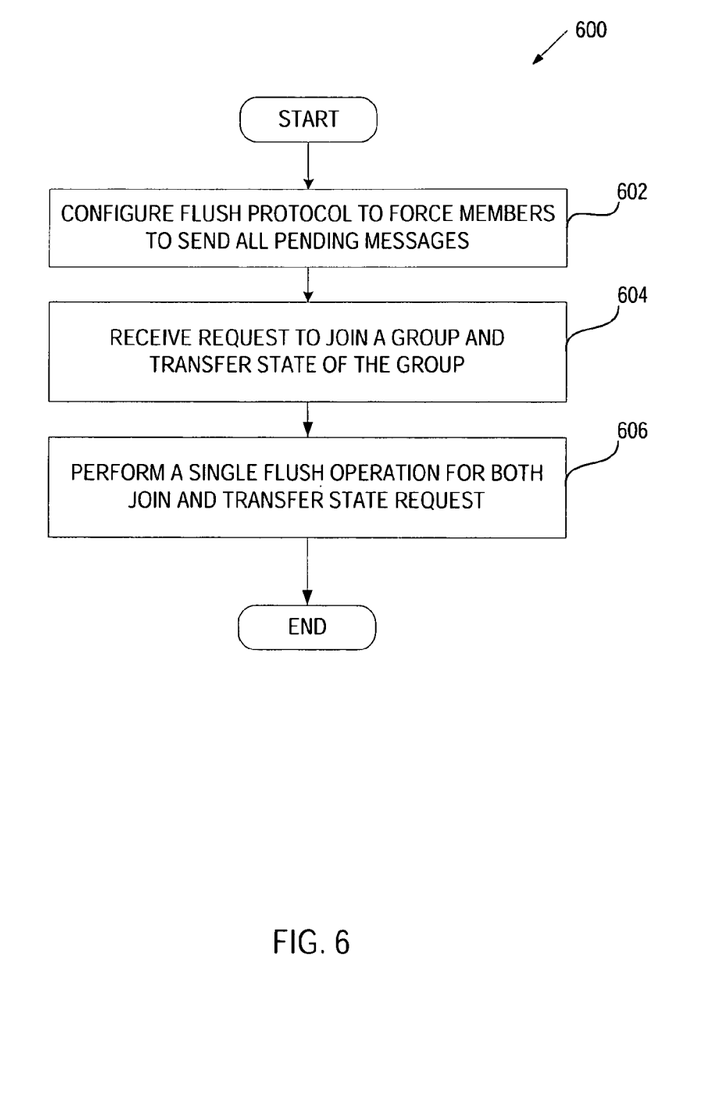
FIG. 6 illustrates a flow diagram of a method for performing a single FLUSH operation for both a join request and a state transfer request.

FIG. 6 is a flow diagram illustrating a computer-implemented method for configuring a flush protocol. A flow control application protocol may be written in JAVA™ to provide reliable multicast communication. At 602, a flush protocol is configured to force members of a group to send all of their pending messages prior to a predetermined event. At 604, a client identifies the group members and the corresponding coordinator of the group. The client then sends a request to the coordinator to join the group and to transfer a state of the group to the client. At 606, the coordinator performs only one flush protocol is performed in response to the request. In one embodiment, each members of the group includes a Java-based object.

Figure 7:
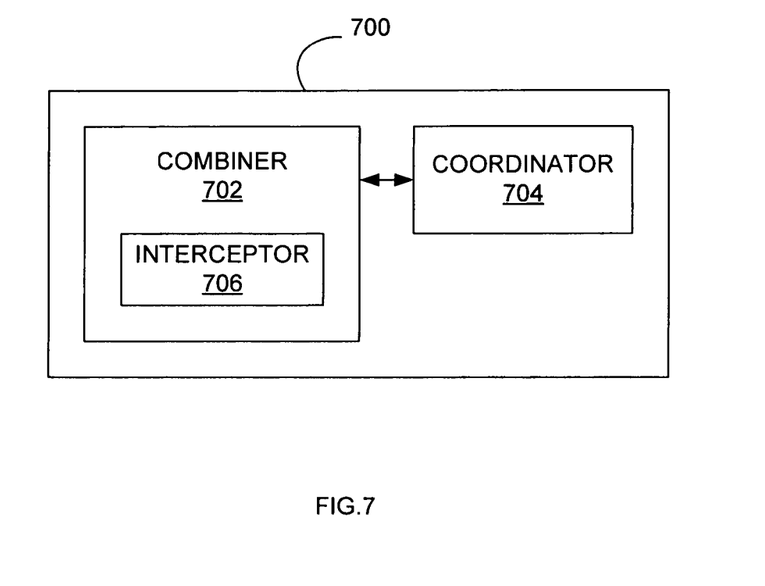
FIG. 7 is block diagram illustrating a system for combing joint and state transfer requests from a client.

FIG. 7 is block diagram illustrating a system 700 for combining joint and state transfer requests from a client. In one embodiment, system 700 includes a combining module 702 coupled to a coordinator 704. Combining module 702 receives a request from a client to join and transfer a state of a group to the client. Coordinator 704 is associated with the group. Coordinator 704 is coupled to combining module 702 to configure a flush protocol to force members of the group to send all of their pending messages prior to a predetermined event and to perform a single flush protocol on the group on behalf of the client in response to the request. In one embodiment, combining module includes an interceptor 706 to intercept the client's request to transfer the state of the group, and to replace the client's request to transfer the state of the group with a request to join the state of the group without the coordinator having to perform another flush protocol.

It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Thus, a method and apparatus for configuring a flush protocol has been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
configuring a flush protocol to force members of a group to send all of their pending messages prior to a predetermined event;
receiving a request from a client to both join the group and transfer a state of the group to the client;
intercepting the request to transfer the state of the group;
replacing the request to transfer the state of the group with a request to join the group without performing a flush operation in response to the request to transfer the state of the group; and
performing a single flush operation on the group in response to the request to join the group.

2. The computer-implemented method of claim 1 further comprising
identifying members of the group and a coordinator associated with the group,
wherein the client requests the coordinator to perform the single flush operation upon joining the group.

3. The computer-implemented method of claim 2 wherein the request to transfer the state of the group includes a request to see a same set of messages in a same view prior to installing a new view.

4. The computer-implemented method of claim 3 wherein said performing the single flush operation comprises running a messages exchange phase that makes sure that all members of the group have seen the same set of messages in the same view prior to installing the new view.

5. The computer-implemented method of claim 4, wherein said running the messages exchange phase is completed before the completion of the single flush operation, and wherein said running the messages exchange phase comprises multicasting all messages received from other members of the group before multicasting an indication of the completion of the single flush operation.

6. The computer-implemented method of claim 4, wherein said running the messages exchange phase is completed before the completion of the single flush operation, and wherein said running the messages exchange phase comprises:
exchanging digests with highest sequence numbers seen for all members of the group; and
multicasting only the missing messages.

7. The computer-implemented method of claim 2 wherein the request to join the group includes a flush flag parameter, the flush flag parameter including a boolean operator corresponding to the single flush operation.

8. The computer-implemented method of claim 7 further comprising:
generating a new view upon joining the client with the group;
sending the new view to the members of the group; and
receiving an acknowledgment from the members of the group of the new view.

9. The computer-implemented method of claim 8 wherein each members of the group includes a Java-based object.

10. A non-transitory computer-readable medium containing data and instructions to cause a programmable processor to perform operations comprising:

configuring a flush protocol to force members of a group to send all of their pending messages prior to a predetermined event;

receiving a request from a client to both join the group and transfer a state of the group to the client;

intercepting the request to transfer the state of the group;

replacing the request to transfer the state of the group with a request to join the group without performing a flush operation in response to the request to transfer the state of the group; and performing a single flush operation on the group in response to the request to join the group.

11. The non-transitory computer-readable medium of claim 10 wherein the method further comprises identifying members of the group and a coordinator associated with the group, wherein the client requests the coordinator to perform the single flush operation upon joining the group.

12. The non-transitory computer-readable medium of claim 11 wherein the request to transfer the state of the group includes a request to see a same set of messages in a same view prior to installing a new view.

13. The non-transitory computer-readable medium of claim 12 wherein said performing the single flush operation comprises running a messages exchange phase that makes sure that all members of the group have seen the same set of messages in the same view prior to installing the new view.

14. The non-transitory computer-readable medium of claim 13, wherein said running the messages exchange phase is completed before the completion of the single flush operation, and wherein said running the messages exchange phase comprises multicasting all messages received from other members of the group before multicasting an indication of the completion of the single flush operation.

15. The non-transitory computer-readable medium of claim 13, wherein said running the messages exchange phase is completed before the completion of the single flush operation, and wherein said running the messages exchange phase comprises:

exchanging digests with highest sequence numbers seen for all members of the group; and multicasting only the missing messages.

16. The non-transitory computer-readable medium of claim 11 wherein the request to join the group includes a flush flag parameter, the flush flag parameter including a boolean operator corresponding to the single flush operation.

17. The non-transitory computer-readable medium of claim 16 wherein the method further comprises:

generating the new view upon joining the client with the group;

sending the new view to the members of the group; and receiving an acknowledgment from the members of the group of the new view.

18. The non-transitory computer-readable medium of claim 17 wherein each members of the group includes a Java-based object.

19. A system comprising:

a memory;

a processing device coupled to the memory, the processing device comprising a combining module and a coordinator module, wherein the combining module is configured to receive a request from a client to both join a group and transfer a state of the group to the client, the combining module comprising an interceptor to intercept the client's request to transfer the state of the group, and to replace the client's request to transfer the state of the group with a request to join the group without the coordinator having to perform a flush operation in response to the request to transfer the state of the group;

wherein the coordinator associated with the group is to configure a flush protocol to force members of the group to send all of their pending messages prior to a predetermined event and to perform a single flush operation on the group on behalf of the client in response to the request to join the group.

20. The system of claim 19 wherein the request to transfer the state of the group includes a request to see a same set of messages in a same view prior to installing a new view.

21. The system of claim 20 wherein the request to join the group includes a flush flag parameter, the flush flag parameter including a boolean operator corresponding to the single flush operation.

22. The system of claim 21 wherein the coordinator is to generate a new view upon joining the client with the group, to send the new view to the members of the group, and to receive an acknowledgment from the members of the group of the new view.

23. The system of claim 22 wherein each members of the group includes a Java-based object.

24. The system of claim 20 wherein the coordinator is configured to run a messages exchange phase that makes sure that all members of the group have seen the same set of messages in the same view prior to installing the new view.

25. The system of claim 24 wherein the coordinator is configured to complete the messages exchange phase before completion of the single flush operation, and to multicast all messages received from other members of the group before multicasting an indication of the completion of the single flush operation when running the messages exchange phase.

26. The system of claim 24 wherein the coordinator is configured to complete the messages exchange phase before completion of the single flush operation, and to exchange digests with highest sequence numbers seen for all members of the group and multicast only the missing messages when running the messages exchange phase.

* * * * *